US010424145B2

(12) United States Patent
Rogers et al.

(10) Patent No.: US 10,424,145 B2
(45) Date of Patent: Sep. 24, 2019

(54) METHODS AND SYSTEMS FOR PROCESSING TRANSACTIONS

(71) Applicant: First Data Corporation, Greenwood Village, CO (US)

(72) Inventors: SuZanne Rogers, Elkhorn, NE (US); Timothy Horton, Papillion, NE (US); Gary J. Trainor, Duluth, GA (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 15/968,095

(22) Filed: May 1, 2018

(65) Prior Publication Data

US 2018/0247482 A1   Aug. 30, 2018

Related U.S. Application Data

(60) Division of application No. 13/426,046, filed on Mar. 21, 2012, now Pat. No. 9,978,199, which is a
(Continued)

(51) Int. Cl.
*G06Q 40/00* (2012.01)
*G07F 7/08* (2006.01)
(Continued)

(52) U.S. Cl.
CPC ............. *G07F 7/08* (2013.01); *G06Q 20/023* (2013.01); *G06Q 20/10* (2013.01); *G06Q 20/20* (2013.01);
(Continued)

(58) Field of Classification Search
CPC ................................. G06Q 40/00; G06F 7/08
See application file for complete search history.

(56) References Cited

U.S. PATENT DOCUMENTS 3,935,361 A   1/1976   Dorfman et al.
5,276,311 A   1/1994   Hennige
(Continued)

FOREIGN PATENT DOCUMENTS

EP   1052603 A    11/2000
WO   00/065500    11/2000
WO   03/065227 A   6/2003

OTHER PUBLICATIONS

Stan Sienkiewicz, The Evolution of EFT Networks from ATMs to New On-Line Debit Payment Products, Apr. 2002, Federal Reserve Bank of Philadelphia, web, 2-12 (Year: 2002).*
(Continued)

*Primary Examiner* — I Jung Liu
(74) *Attorney, Agent, or Firm* — Kilpatrick Townsend & Stockton LLP

(57) ABSTRACT

Methods and systems are provided for processing a transaction between a first party and a second party. Information defining terms of the transaction and identifying a presentation instrument are received at a host system. Preference information associated with the presentation instrument is retrieved with the host system. The preference information specifies terms for an allocation of transaction amounts among multiple transaction types. An amount for the transaction is allocated among the transaction types in accordance with terms of the transaction and the terms for the allocation.

2 Claims, 9 Drawing Sheets

Related U.S. Application Data continuation of application No. 11/055,028, filed on Feb. 9, 2005.

(60) Provisional application No. 60/543,513, filed on Feb. 10, 2004.

(51) Int. Cl.
  *G06Q 40/04* (2012.01)
  *G06Q 20/02* (2012.01)
  *G06Q 20/10* (2012.01)
  *G06Q 20/20* (2012.01)
  *G06Q 20/40* (2012.01)
  *G06Q 30/06* (2012.01)
  *G06Q 40/02* (2012.01)

(52) U.S. Cl.
  CPC ......... *G06Q 20/4037* (2013.01); *G06Q 30/06* (2013.01); *G06Q 40/02* (2013.01); *G06Q 40/04* (2013.01)

(56) References Cited

U.S. PATENT DOCUMENTS

| | | |
|---|---|---|
| 5,297,026 A | 3/1994 | Hoffman |
| 5,477,040 A | 12/1995 | Lalonde |
| 5,590,038 A | 12/1996 | Pitroda |
| 5,649,118 A | 7/1997 | Carlisle et al. |
| 5,744,787 A | 4/1998 | Teicher |
| 5,764,789 A | 6/1998 | Pare, Jr. et al. |
| 5,787,404 A | 7/1998 | Fernandez-Holmann |
| 5,805,719 A | 9/1998 | Pare, Jr. et al. |
| 5,839,117 A | 11/1998 | Cameron et al. |
| 5,864,830 A | 1/1999 | Armetta et al. |
| 5,930,764 A | 7/1999 | Melchione et al. |
| 5,955,961 A | 9/1999 | Wallerstein |
| 5,991,736 A | 11/1999 | Ferguson et al. |
| 6,029,150 A | 2/2000 | Kravitz |
| 6,070,153 A | 5/2000 | Simpson |
| 6,076,075 A | 6/2000 | Teicher |
| 6,138,239 A | 10/2000 | Veil |
| 6,163,604 A | 12/2000 | Baulier et al. |
| 6,185,545 B1 | 2/2001 | Resnick et al. |
| 6,289,324 B1 | 9/2001 | Kawan |
| 6,298,336 B1 | 10/2001 | Davis et al. |
| 6,330,978 B1 | 12/2001 | Molano et al. |
| 6,547,132 B1 | 4/2003 | Templeton et al. |
| 6,580,440 B1 | 6/2003 | Wagner et al. |
| 6,598,024 B1 | 7/2003 | Walker et al. |
| 6,631,849 B2 | 10/2003 | Blossom |
| 6,678,664 B1 | 1/2004 | Ganesan |
| 6,685,088 B1 | 2/2004 | Royer et al. |
| 6,758,394 B2 | 7/2004 | Maskatiya et al. |
| 6,827,260 B2 | 12/2004 | Stoutenburg et al. |
| 6,886,742 B2 | 5/2005 | Stoutenburg et al. |
| 6,941,279 B1 | 9/2005 | Sullivan |
| 7,050,996 B1 | 5/2006 | Blagg et al. |
| 7,051,002 B2 | 5/2006 | Keresman et al. |
| 7,086,584 B2 | 8/2006 | Stoutenburg et al. |
| 7,191,952 B2 | 3/2007 | Blossom |
| 7,326,624 B2 | 2/2008 | Osaki et al. |
| 7,386,515 B2 | 6/2008 | Turgeon |
| 7,580,857 B2 | 8/2009 | VanFleet et al. |
| 7,600,673 B2 | 10/2009 | Stoutenburg et al. |
| 7,620,567 B2 | 11/2009 | George et al. |
| 7,778,903 B2 | 8/2010 | Weichert et al. |
| 8,099,361 B1 | 1/2012 | Gupta et al. |
| 8,190,530 B2 | 5/2012 | Redmond et al. |
| 9,978,199 B2 | 5/2018 | Liu |
| 2001/0027441 A1 | 10/2001 | Wankmueller |
| 2002/0069158 A1 | 6/2002 | Larkin et al. |
| 2002/0087344 A1* | 7/2002 | Billings ............... G06Q 40/04 705/39 |
| 2002/0152180 A1 | 10/2002 | Turgeon |
| 2002/0153414 A1 | 10/2002 | Stoutenburg et al. |
| 2002/0174013 A1 | 11/2002 | Freeman |
| 2003/0009382 A1 | 1/2003 | D'Arbeloff et al. |
| 2003/0014371 A1 | 1/2003 | Turgeon |
| 2003/0061093 A1 | 3/2003 | Todd |
| 2003/0126094 A1 | 7/2003 | Fisher et al. |
| 2003/0158818 A1 | 8/2003 | George |
| 2003/0204457 A1 | 10/2003 | Arias |
| 2004/0024703 A1 | 2/2004 | Roskind |
| 2004/0066273 A1 | 4/2004 | Cortina |
| 2004/0083170 A1 | 4/2004 | Bam |
| 2004/0088243 A1 | 5/2004 | McCoy et al. |
| 2004/0127256 A1* | 7/2004 | Goldthwaite ........ G06K 7/0004 455/558 |
| 2004/0133474 A1 | 7/2004 | Tami et al. |
| 2004/0138989 A1 | 7/2004 | O'Malley et al. |
| 2004/0215560 A1* | 10/2004 | Amalraj ............... G06Q 20/04 705/40 |
| 2004/0225602 A1 | 11/2004 | Smith |
| 2004/0232225 A1 | 11/2004 | Bishop |
| 2004/0260607 A1 | 12/2004 | Robbins et al. |
| 2005/0033702 A1 | 2/2005 | Holdsworth |
| 2005/0080692 A1 | 4/2005 | Padam et al. |
| 2005/0192895 A1 | 9/2005 | Rogers et al. |
| 2005/0234817 A1 | 10/2005 | VanFleet et al. |
| 2005/0234822 A1 | 10/2005 | VanFleet et al. |
| 2006/0178986 A1* | 8/2006 | Giordano ............ G06Q 20/20 705/40 |
| 2008/0033879 A1 | 2/2008 | Blinn et al. |
| 2012/0136752 A1 | 5/2012 | Gupta et al. |

OTHER PUBLICATIONS

EP Search Report dated Jul. 20, 2009 for Application No. EP 05752194, 2 pages.

Non-Final Office Action dated Oct. 4, 2016 for related U.S. Appl. No. 13/426,046, all pages.

Final Office Action dated Apr. 21, 2016 for U.S. Appl. No. 13/426,046, all pages.

International Search Report in related matter PCT/US05/04253, dated Oct. 31, 2005, all pages.

* cited by examiner

METHODS AND SYSTEMS FOR PROCESSING TRANSACTIONS

CROSS-REFERENCES TO RELATED APPLICATIONS

This application is a divisional of U.S. patent application Ser. No. 13/426,046, filed Mar. 21, 2012, entitled "METHODS AND SYSTEMS FOR PROCESSING TRANSACTIONS," which is a continuation of U.S. patent application Ser. No. 11/055,028, filed Feb. 9, 2005, entitled "METHODS AND SYSTEMS FOR PROCESSING TRANSACTIONS" which is a nonprovisional of U.S. Pat. Appl. No. 60/543,513, entitled "METHODS AND SYSTEMS FOR PROCESSING TRANSACTIONS," filed Feb. 10, 2004 by SuZanne Rogers et al., the entire disclosures of which are incorporated herein by reference for all purposes.

BACKGROUND OF THE INVENTION

This application relates generally to transaction processing. More specifically, this application relates to methods and systems that provide presentation instruments used in transactions with multiple functions.

Currently, transaction processing is handled in a manner that is largely focused on the needs of financial institutions that may be involved in the transactions as third parties. For example, in the case of credit transactions, a customer is typically provided with a credit card by a financial institution, with the card having information on it in the form of a magnetic stripe to identify a credit account maintained by the financial institution. The customer is able to engage in transactions by presenting the card information, either by presenting the physical card itself, such as during a transaction at a "brick & mortar" merchant location, or by presenting the card number, such as during a telephone or internet transaction. The transaction is effected by the merchant transmitting the credit-card information to an authority, who issues an authorization or denial depending on whether the transaction amount comports with terms associated with the credit account. The customer does not actually pay for the transaction until he makes a payment in response to an invoice provided by the financial institution, usually on a monthly basis.

In another example, transactions may be effected using debit instruments. Such transactions may superficially appear to be similar to credit transactions in that a customer is provided with a debit card by a financial institution, which may be presented during transactions so that the merchant may seek approval from an authority. In this instance, however, the authorization depends on a balance in an associated financial account rather than on a predetermined credit limit, and funds are automatically transferred in response to the transaction. In still other examples, transactions may be effected using checks or alternative methods to access demand-deposit-account ("DDA") funds, whose processing is typically on the order of days and may involve routing through a reserve system and/or the Automated Clearing House ("ACH") system.

Since this structure is focused on the needs of financial institutions, it is unsurprising that there are a number of disadvantages associated with it from the perspective of customers and merchants, who are the principal parties in transactions. From a customer's perspective, the system is rigid, lacking in flexibility to provide significant choice in processing, and requiring that the customer maintain multiple instruments merely to be afforded the ability to engage in different types of transactions. From the perspective of merchants, there are numerous transaction costs that must be borne and which vary depending on the level of risk that the transactions represent for the financial institutions, and merchants are also denied significant flexibility of choice. For example, ACH transactions may be provided at relatively low cost, debit transactions at intermediate cost and varying depending on whether they are accompanied by a customer signature, and credit transactions at relatively high cost. The differences in risk to the financial institutions that these cost differences represent are generally associated with whether the transactions are guaranteed and the timing with which funds to support them are received.

There is, accordingly, a general need in the art for methods and systems that provide greater choice and flexibility to customers and merchants, while also accommodating concerns of involved financial institutions.

BRIEF SUMMARY OF THE INVENTION

Embodiments of the invention make use of a host system having a capacity to interface with parties, such as with merchant systems and customers, through a variety of alternative mechanisms, and also to interface with financial institutions that may be involved in transactions. The host system maintains preferences information correlated with individual presentation instruments or individual customers to effect customer-specified ways of treating transactions. The manner in which such transactions are treated thus provides improved flexibility and choice to both customers and merchants, among other advantages that will be evident to those of skill in the art after reading this disclosure.

In some embodiments, a method is provided for processing a transaction between a first party and a second party. Information defining terms of the transaction and identifying a presentation instrument are received at a host system. Preference information associated with the presentation instrument as retrieved with the host system. The preference information specifies terms for an allocation of transaction amounts among a plurality of transaction types. An amount for the transaction is allocated among the plurality of transaction types in accordance with terms of the transaction and the terms for the allocation.

In one embodiment, the transaction is one of a plurality of transactions between first parties and second parties. The method further comprises initiating settlement of the plurality of transactions with the host system in accordance with respective allocations of respective transaction amounts among the plurality of transaction types. In another embodiment, the transaction is also one of a plurality of transactions between first parties and second parties, and a fraud analysis of the plurality of transactions is performed with the host system.

There are a variety of different types of terms for the allocation that are within the scope of the invention. For example, in one embodiment, such terms specify one or more transaction types based on an identification of the second party. In another embodiment, such terms specify one or more particular transaction types based on an identification of a type of product included in the transaction. In a further embodiment, such terms specify one or more particular transaction types based on the amount for the transaction. In some instances, the terms may require denial of the transaction if a defined characteristic is included in the terms of the transaction. For example, such denial could be required based on an identity of the second party or an identification of a type of product included in the transaction.

In some cases, the information received at the host system may additionally include first-party-identification information, in which case the first party may be authenticated on the basis of the first-party-identification information. There are a variety of different types of first-party-identification information that might be used. For example, the first-party-identification information could comprise biometric information of the first party, a signature of the first party, an encryption certificate, and the like.

Embodiments of the invention may also be used by a number of different types of parties in different relationships. For instance, in one embodiment, the first party is a customer and the second party is a merchant, with the transaction comprising a transaction for a sale of goods or services by the customer from the merchant. In another embodiment, the first party is a patient and the second party is a healthcare provider, with the transaction comprising a transaction for services provided by the healthcare provider to the patient.

In some instances, the transaction may require that an identifier associated with the presentation instrument, such as a personal identification number, be provided. In such embodiments, the host system may receive an identifier purportedly associated with the presentation instrument and verify that it is associated with the presentation instrument. The presentation instrument may also comprise a mark identifying it as available for use with the host system in some embodiments.

Embodiments of the invention may also accommodate the use of different types of value. For instance, in one embodiment, the terms of the transaction require payment to the second party using a first form of value and at least one of the plurality of transaction types identifies a second form of value distinct from the first form of value. In such an embodiment, the second form of value is converted to the first form of value. Such value conversions may also be made in embodiments where a financial account is replenished. A request may be received from the first party to replenish a financial account associated with the first party by the host system, with the request identifying a second financial account to act as a source of replenishment value. A transfer of value may then be made from the second financial account to the first financial account in accordance with the request. If the first financial account maintains a first form of value and the second financial account maintains a second form of value distinct from the first form of value, the second form of value may be converted to the first form of value.

In some embodiments, a request for an authorization for the transaction is also made. The authorization request may be made from a third-party guarantor. In one embodiment, an optimal routing for an authorization request through a network interfaced with the host system is determined. The request is transmitted through the network over the determined optimal routing.

The methods of the invention may be embodied in a computer-readable storage medium having a computer-readable program for directing operation of a host computer. The host computer may include a communications system, a processor, and a storage device. The computer-readable program includes instructions for operating the host system to process transactions in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1:
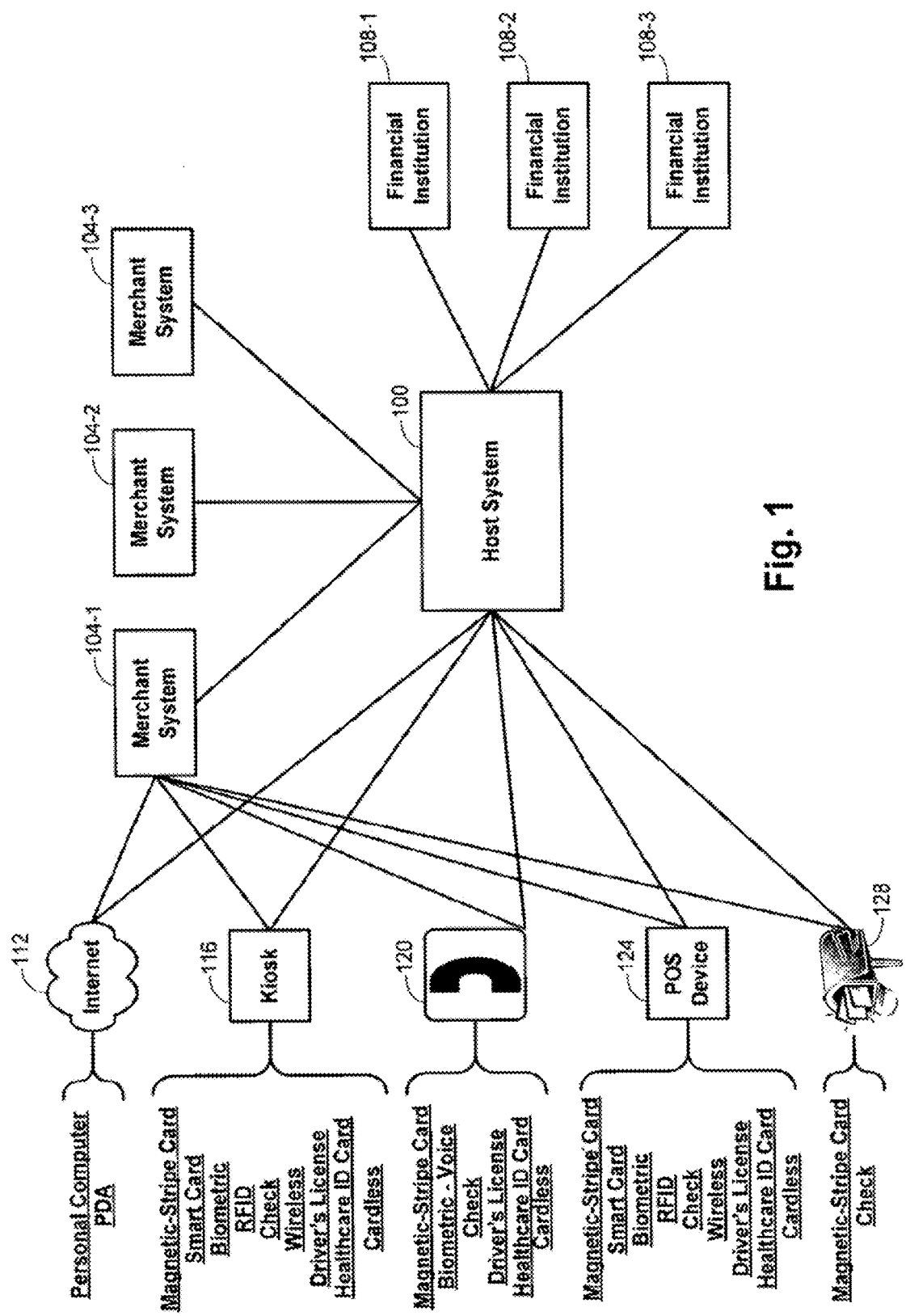
FIG. 1 is a block-diagram representation of an exemplary architecture for implementing methods of the invention in an embodiment.

Embodiments of the invention provide methods and systems for processing transactions between parties. These embodiments make use of a host system configured to perform functions in processing a variety of different types of transactions, which may in some instances be initiated for the same customer with a single presentation instrument, although in other embodiments may use multiple presentation instruments. For exemplary purposes, the following discussion frequently identifies the two parties to a transaction as a customer and a merchant or financial institution, but such references are not intended to be limiting. More generally, the methods and systems described herein may be used in processing transactions between any parties, including transactions between two individuals, between two companies, between a company and an individual, and the like. In those embodiments where the parties comprise a merchant or financial institution and a customer, the transaction is generally a commercial transaction, but the invention is also not limited to commercial transactions and may comprise any type of transaction between parties. Other examples of transactions may include transactions where the first party is a patient and the second party is a healthcare provider, with the transaction comprising a transaction for healthcare services provided by the healthcare provider to the patient.

As used herein, the term "presentation instrument" is intended to refer to any document or device that includes information identifying the first party to a transaction, usually the payor, and that may be used to initiate processing of a transaction as described herein. In some embodiments, the first party is customer. For example, a presentation instrument could comprise a magnetic-stripe card, such as a credit card, debit card, stored-value card, payroll card, private-label card, loyalty card, and the like. Alternatively, a presentation instrument could comprise a card having a barcode or could comprise a chip card, sometimes referred to as a "smart" card that includes an embedded microchip. In some instances, the presentation instrument could comprise a check or other negotiable instrument. Radio-frequency identification devices ("RFIDs") may sometimes be used as presentation instruments, and may be implemented in a wide variety of forms, such as key fobs, cell phones, automatic toll-pass transponders, and the like. In some embodiments, the presentation instrument may even comprise a biometric of a first party, such as the first party's voiceprint, retinal image, or other biometric. Still other cardless presentation instruments may be used in further embodiments.

Also, references herein to "transaction types" is intended to refer to distinct groups of transactions that have common processing characteristics. Examples of transaction types include credit transactions, debit transactions, ACH transactions, stored-value transactions, and the like. Credit transactions include those transactions in which a financial institution provides funds on behalf of a first party in accordance with a credit agreement; many individuals may have multiple credit arrangements with different financial institutions or even with the same institution. Debit transactions include those transactions in which funds are transferred from a financial account of the first party automatically in response to the transaction; many individuals may also have multiple debit arrangements with the same or different financial institutions in various embodiments. ACH transactions include those transactions that make use of the Automated Clearing House, including a variety of electronic-check or other electronic-commerce payments. Stored-value transactions include those transactions in which a prepaid amount is associated with a presentation instrument; execution of the transaction results in a reduction of the prepaid amount in accordance with the amount of the transaction.

Embodiments of the invention also provide for use of different forms of "value," which is used generically herein to refer to anything having financial worth. For example, value may include any type of currency, such as U.S. dollars, euro, U.K. pounds, and the like, and may also include other quantities having financial worth. Other examples include accumulated cellular-telephone minutes, loyalty points, airline miles, coupons, and the like. In addition, value may include electronic currency of a type to be designed specifically for use in electronic transactions, such as on the Internet, as a form of digitally minted coin. This and other forms of financial worth not yet developed are intended to be within the scope of the term "value." References to a "financial account" are accordingly also intended to be construed broadly, referring to an account that maintains an identification of any type of value; as used herein, a "financial account" may hold cellular-telephone minutes, airlines miles, and the like, in addition to holding more traditional forms of value by specifying a level of currency.

FIG. 1 provides a schematic illustration of how the host system 100 may be integrated within an architecture to support the variety of transaction types that are enabled by embodiments of the invention. The host system 100 is configured for communication with a variety of different entities, including financial institutions 108 that may be involved as third parties to transactions, as well as merchants and customers who may be direct second and first parties to the transactions. Interactions with the host system and second parties may take place with merchant systems 104 that are configured to perform merchant-end processing functions. Communication between the host system 100 and the merchant systems 104 and financial institutions 108 is shown as comprising dedicated communication lines, but it will be appreciated that such communication may take place through any suitable communications arrangement, including through a variety of types of networked configurations, including wide-area networks, local-area networks, wireless networks, and the like.

There are a variety of specific ways in which customers may communicate with the host system 100 and/or merchant systems 104, some of which are indicated explicitly in FIG. 1. These different communications mechanisms may support different types of presentation instruments, some examples of which are shown explicitly in FIG. 1 for the different communications mechanisms indicated. For example, in some embodiments, communications may take place over the Internet 112 or other public network system that supports interfaces to computational devices such as personal computers, PDAs, and the like. In many instances, an identifier for the presentation instrument may be communicated by inputting information for the presentation instrument with a keyboard or similar device. For example, with a transaction involving a credit card, the credit-card number may be typed in together with a related identifier such as the expiration date of the card and/or a security code that may be printed on the back of the card. In other instances, the presentation instrument may take the form of a computer-readable storage device having information stored on it that may be extracted to function in a fashion similar to a debit card. An example of such a presentation instrument is described in U.S. patent application Ser. No. 09/394,143, entitled "SYSTEM AND METHOD FOR PROVIDING SECURE SERVICES OVER PUBLIC AND PRIVATE NETWORKS USING A REMOVABLE, PORTABLE COMPUTER-READABLE STORAGE MEDIUM AT A NETWORK ACCESS DEVICE," filed Sep. 10, 1999 by Paul Charles Turgeon, and Ser. No. 10/086,793, entitled "SYSTEM AND METHOD FOR PERFORMING SECURE REMOTE REAL-TIME FINANCIAL TRANSACTIONS OVER A PUBLIC COMMUNICATIONS INFRASTRUCTURE WITH STRONG AUTHENTICATION," filed Mar. 1, 2002 by Paul Charles Turgeon, the entire disclosures of both of which are incorporated herein by reference for all purposes.

In other embodiments, the communications may take place at a kiosk 116, which may be equipped with a variety of different types of reading devices to enable extraction of relevant information from a corresponding variety of different presentation instruments. For example, a kiosk might be configured with a magnetic-stripe reader to read magnetic-stripe cards, including credit, debit, stored-value, and other such cards. The kiosk might additionally or alternatively be equipped with a chip-card reader to read information from chip cards. In addition, the kiosk might additionally or alternatively be equipped with a biometric reader, such as a voiceprint reader, retinal scanner, fingerprint reader, or the like. In some instances, the kiosk might additionally or alternatively comprise an radio-frequency reader to enable reading of RFID devices, such as a key fob or other device. This is an example of more a more general class of devices that use wireless communication. A magnetic-ink reader might also additionally or alternatively be provided with the kiosk to enable checks or other negotiable instruments having magnetic-ink characters to be read. In some instances, the kiosk may include devices for reading information from other documents such as driver's licenses, healthcare cards, and other identification cards. The manner in which such information may be read may depend on the nature of the document, and may include optical reading, magnetic-stripe reading, chip reading, and the like. The drawing also notes that in addition to the specific devices described above, the kiosk may also be equipped to perform other types of cardless transactions.

In some instances, a point-of-sale device 124 may be provided with similar capabilities as those described for the kiosk, enabling information to be extracted from a variety of different types of presentation instruments, including magnetic-stripe cards, chip cards, customer biometrics, RFID and other wireless devices, checks, driver's licenses, healthcare cards, and the like, in addition to being equipped to perform a variety of other types of cardless transactions. The point-of sale device 124 may take a variety of different forms, including devices that may be operated by merchant clerks, may be self-operated by customers, or may extract information automatically. Examples of point-of-sale devices that have such varied functionality are described in the following commonly assigned applications, the entire disclosures of which are incorporated herein by reference for all purposes: U.S. Prov. Pat. Appl. No. 60/147,889, entitled "INTEGRATED POINT OF SALE DEVICE," filed Aug. 9, 1999 by Randy J. Templeton et al.; U.S. patent application Ser. No. 09/634,901, entitled "POINT OF SALE PAYMENT SYSTEM," filed Aug. 9, 2000 by Randy J. Templeton et al.; U.S. patent application Ser. No. 10/116,689, entitled "SYSTEMS AND METHODS FOR PERFORMING TRANSACTIONS AT A POINT-OF-SALE," filed Apr. 3, 2002 by Earney Stoutenburg et al.; U.S. patent application Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. patent application Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. patent application Ser. No. 10/116,735, entitled "SYSTEMS AND METHODS FOR CONFIGURING A POINT-OF-SALE SYSTEM," filed Apr. 3, 2002 by Earney Stoutenburg (sometimes referred to collectively herein as "the point-of-sale device applications"). An example of a point-of-sale device 124 that extracts information automatically is a toll-pass reader, which is equipped to recognize radio-frequency signals from a presentation instrument in the form of a toll-pass transponder.

A further mechanism that may be provided to permit communications may be a telephone device 120 that transmits telephone signals over a telephone network to a merchant system 104 and/or the host system. The telephone device 120 may be equipped in different ways depending on the type of presentation instrument to be used. For example, in the simplest cases, the telephone device may simply convert the voice of the customer so that identification information may be read by the customer from a magnetic-stripe card, check, driver's license, healthcare card, or similar tangible presentation instrument. This voice information could be received by a customer-service representative at the merchant or host, who would then enter the received information to the merchant system 104 or host system 100 as necessary. For example, such interaction between the customer and service representative could be used as part of a telephone-ordering system to arrange transactions. Alternatively, the voice information could be analyzed by voice-recognition protocols to extract the relevant information automatically. In other instances, such as where the presentation instrument comprises a customer's biometric, particularly the customer's voice pattern, the voice information could be analyzed using biometric protocols to identify the customer. In other cases, the telephone device 120 may be equipped to provide dual-tone multiple-frequency ("DTMF") tones, such as are commonly provided by touch-tone telephones. The customer could then enter information from a tangible presentation instrument such as a magnetic-stripe card or check manually, with the telephone device 120 transmitting the DTMF tones to the host system 100 or merchant system 104 as required. In addition to these specific devices, the telephone interface may also be used for the execution of other types of cardless transactions.

Embodiments of the invention may also support traditional mail-order functions 128 in cases where the information identifying the presentation instrument may be transmitted by mail. For example, information from magnetic-stripe cards might be copied onto order forms by a customer for mailing to a merchant, with the information being entered manually into the merchant system 104 by a clerk. In another embodiment, a check might be mailed with an order made by a customer to a merchant, with the information from the check similarly being entered manually into the merchant system 104 by a clerk.

In the various embodiments described in connection with FIG. 1, there may be a requirement that an identifier, such as a personal-identification number, be associated with the presentation instrument. Authorization for a transaction may then require that both the presentation instrument and the identifier be provided. For instance, in an embodiment where the presentation instrument comprises an RFID embodied in a cellular telephone, authorization for a transaction may require detection of the RFID as well as having a correct PIN supplied by the person using the cellular telephone. A similar requirement may be imposed with any tangible presentation instrument, including any devices that embody an RFID and any of the various types of cards described above, and may in some embodiments by imposed where the presentation instrument comprises a customer biometric.

In embodiments where the presentation instrument comprises a tangible presentation instrument, the presentation instrument or a device that comprises the presentation instrument may be marked to indicate that the presentation instrument is available for use with the system, although this is not required. The mark may allow the system to benefit generally from goodwill generated by an organization supporting the system, allowing the system to gain increased acceptance from a reputation of convenience and security. The mark may thus appear on a wide variety of different types of instruments and devices—on credit cards, debit cards, driver's licenses, healthcare cards, cellular telephones, personal computers, software run by personal computers, PDAs, checks, key fobs, multichannel point-of-sale devices, and more. It may also be used on various supporting and descriptive material.

Figure 2:
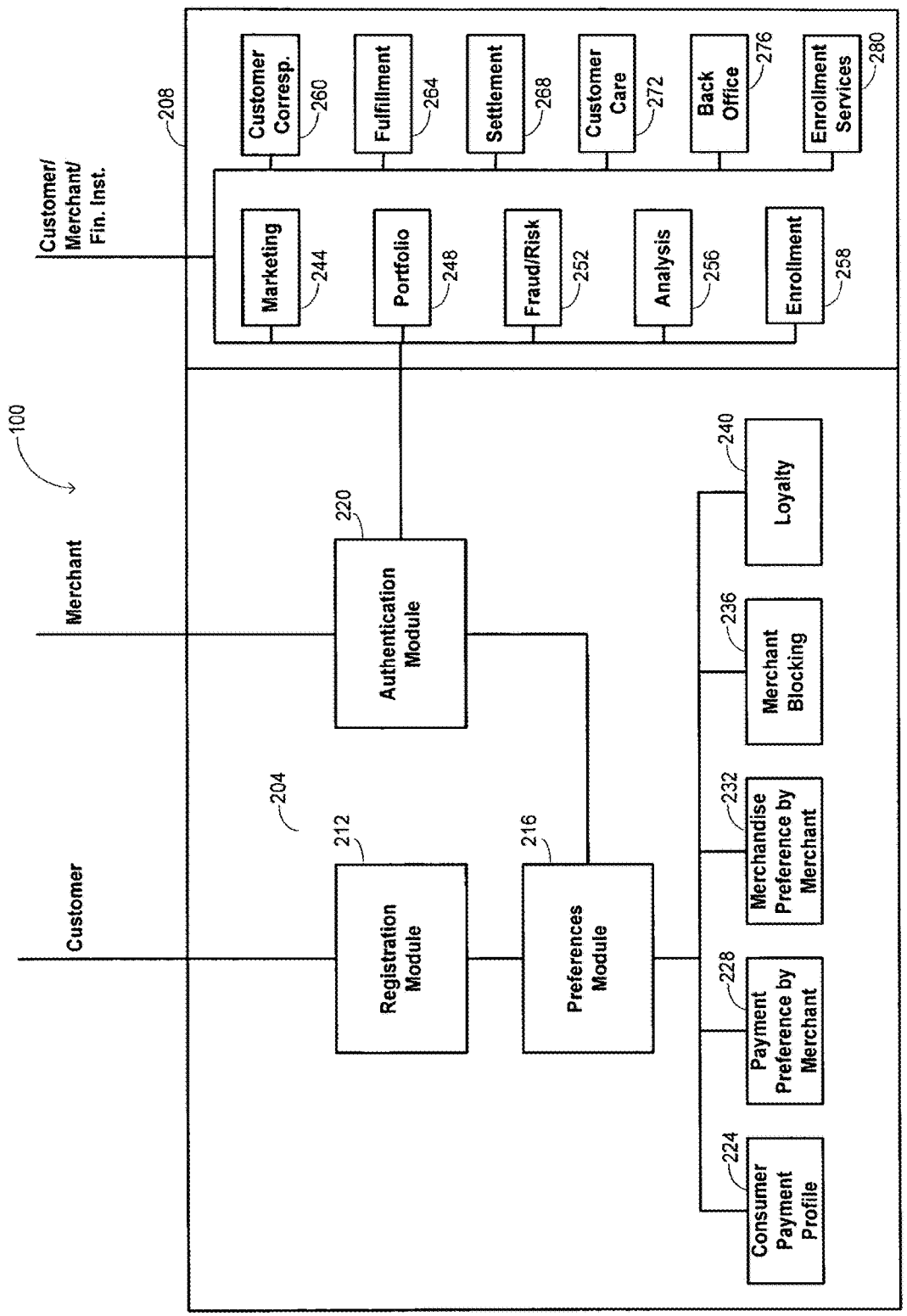
FIG. 2 is a more detailed block-diagram representation of a logical structure of a host system that may be used in implementing embodiments of the invention.

The host system 100 may include a variety of different logical modules that are used to implement methods of the invention. FIG. 2 provides a schematic illustration of a logical structure that may be implemented by the host system 100 in an exemplary embodiment. In some instances, the modules will perform administrative tasks, such as maintaining profiles for customers with preference information as described below, providing reporting functionality, implementing fraud-detection algorithms, and the like. This set of modules is generally denoted by block 208. In other instances, the modules are actively used as part of executing a transaction between the customer and merchant, together with the involvement of a financial institution. In particular, as part of executing such a transaction, information identifying the presentation instrument that is used and identifying certain terms of the transaction will be communicated to the host system 100. This set of modules is generally denoted by block 204.

In many embodiments, initial registration of a customer may proceed automatically when a customer obtains a presentation instrument from a financial institution 108 or merchant. For example, when a customer obtains a debit card from a bank, the customer may choose to be enrolled with the host system 100, with the bank forwarding relevant enrollment information to the host system 100 on the customer's behalf. In the case where a customer obtains a private-label credit card for a particular merchant from that merchant, the enrollment information could be communicated to the host system 100 by the merchant. In other instances, however, the customer may choose to enroll directly with the host system 100. Accordingly, a registration module 212 is provided so that it may be accessed directly by customers using one of the interfaces discussed in connection with FIG. 1. Conveniently, the interface could comprise the Internet. In other embodiments, enrollment may take place at a point-of-sale location, such as described in detail in connection with FIGS. 4A and 4B below. Such embodiments advantageously reduce the time taken for point-of-sale registration mechanisms.

The registration module may also be used by the customer to review and/or update information as necessary. Such a feature is particularly advantageous in connection with maintaining preferences information, which may be used by the customer to define rules for implementing transactions according to specified criteria. The preferences information is maintained by a preferences module 216, which may rely on various submodules to implement different types of preferences. From the perspective of the customer, the ability for the host system 100 to accommodate preferences in this way allows the customer considerably greater flexibility in controlling the financial character of transactions, even to the extent of treating portions of a single transaction differently.

A number of different submodules are indicated to illustrate the different types of preferences that may be provided. This list of examples is not intended to be exhaustive and various other types of preferences that may be implemented will be evident to those of skill in the art after reading this disclosure. One submodule may provide a consumer payment profile 224 that indicates the types of payments that are to be made for different transactions. For example, a consumer payment profile 224 for one customer might indicate payment levels for treating different transactions differently. For example, it might indicate that all purchases less than $100 are to be made by debiting a particular checking account, that all purchases between $100 and $5000 are to be made with Credit Card A, and that all purchases for more than $5000 are to be made with Credit Card B. In another example, the payments might be split among different transaction types so that the first $250 of any transaction is treated as a debit transaction, while any amount above that is treated as a credit transaction with Credit Card A. In some cases, multiple profiles may even be associated with a single presentation instrument, usually each of them corresponding to a different one of several individuals that may use the presentation instrument. For example, among a married couple, different profiles might be maintained for the husband and wife to reflect different characteristics in the way their transactions are to be handled. In still a further example, a consumer payment profile may specify that if a stored-value card is provided as the presentation instrument, then the entire transaction is to be executed using value stored on the stored-value card.

The preference information might also include payment preferences based on an identity of the merchant, as indicated with submodule 228. For example, the preferences information might specify that all purchases made at Merchant X are to be treated by charging Credit Card A, while all other purchases are to be made with Credit Card B. In other instances, the preference information indicates that certain types of products are to be paid for in different ways, as indicated with submodule 232. Merely by way of example, a consumer payment profile 224 for one customer might indicate that gasoline purchases are to be paid with Credit Card A, that food purchases are to be paid by directly debiting a checking account, and that all other purchases are to be paid with Credit Card B. In some instances, this preference assignment may reflect incentives provided by financial institutions that manage the corresponding accounts to use those accounts for particular purposes.

Submodule 236 provides for the ability to block purchases from being made from certain merchants with any of the transaction types. Such a feature may be useful in connection with parental controls where a parent makes certain financial accounts available to a child, but wants to limit potential abuse of that availability. In cases where the child is the only user of a particular presentation instrument, for example, the preferences could specify that all purchases from Merchants X, Y, and Z are blocked. In cases where multiple profiles are associated with a single presentation instrument, the profiles for the parent and child could differ, with the parent being permitted to make purchases at any merchant, but the child being prohibited from making purchases at Merchants X, Y, or Z.

A submodule 240 may also be provided for implementing loyalty programs so that a customer is automatically provided with credit for purchases in accordance with what transaction types are used according to the profiles. In particular, it will be appreciated that embodiments of the invention permit the customer to avoid the need to manage a variety of different presentment instruments. Instead, the customer could simply always use, say, his key fob or loyalty card to perform any variety of credit, debit, ACH, or other types of transactions. Integration of loyalty programs with the host system 100 thus permits the customer still to obtain the benefits provided by those programs notwithstanding the particular presentation instrument that is used. This consequently enhances and enables the implementation of certain loyalty programs.

Merely by way of example, suppose that a customer presented his debit card at Merchant W, and has a profile that specifies that all transactions with Merchant W are to be treated as credit transactions with a credit account at Financial Institution Q. The customer has set up this profile specifically to retain the loyalty benefits of performing those credit transactions when shopping at Merchant W. Accordingly, the host system 100 may effect a credit transaction, notwithstanding the presentation of the debit card, and use the loyalty module to ensure that loyalty credit is applied in accordance with the actual way in which the transaction is executed. Examples of structures that may be used in implementing loyalty programs are described further in copending, commonly assigned U.S. patent application Ser. No. 10/079,927, entitled "SYSTEMS AND METHODS FOR OPERATING LOYALTY PROGRAMS," filed Feb. 19, 2002 by Colleen George and John Cawthorne, the entire disclosure of which is incorporated herein by reference.

When transaction information is transmitted to the host system 100, it will usually originate with the merchant, as indicated in FIG. 2 with the interface with an authentication module 220, although they may sometimes originate at different parties or locations. The authentication module 220 is configured to use the information that is received to verify the identity of the customer. In some cases, such authentication may make use of the presentation-instrument information itself, such as where biometric information is provided, or may make use of supplementary information that is provided with the transaction information. For example, a copy of a signature might be transmitted with the transaction information, in which case the authentication module 220 performs a comparison of the received signature with a file copy of the signature to verify identity. In other instances, an encryption certificate may be provided, such as in the form of a public-key infrastructure ("PKI") certificate, block of information encrypted with a triple data-encryption-standard ("3DES") technique or other suitable encryption technique. Still other forms of identification information that may be bundled with the transaction information are known to those of skill in the art and may be used in alternative embodiments.

The specific administrative modules designated with label 208 in FIG. 2 are provided merely to illustrate the types of administrative functions that the host system 100 may perform and are not intended to be limiting. As the figure illustrates, these administrative modules may be accessed by customers and/or merchants, perhaps depending on the specific nature of the functions they perform. Thus, merely by way of example, a marketing module 244 may be provided to coordinate marketing activities to customers, merchants, and/or financial institutions. Such marketing activities may take the form of sending promotional materials or offers to the customers and/or merchants, and may make use of information obtained regarding those parties from the transactions that are processed. In this way, the marketing information may be delivered in a targeted fashion. A portfolio-management module 248 may be provided to coordinate management of the pool of information that is obtained by the host system 100, and a related portfolio-analysis module 256 may be provided to assist in analyzing that information in specific ways. A customer-correspondence module 260 and customer-care module 272 may be included to coordinate providing information to customers, responding to queries from customers, and the like. Enrollment into the system may be managed by an enrollment module 258 that is supported with a back-office module 276 and an enrollment-services module 280 used individually or in combination to coordinate such support functions as maintaining enrollment data, updating enrollment data, and the like. Interaction with the enrollment module 258 may be used in supporting point-of-sale enrollment processes like those described below in connection with FIGS. 4A and 4B.

A fraud/risk detection and management module 252 may be used advantageously to detect patterns of behavior that are known to indicate an increased likelihood of fraud. This module may implement sophisticated algorithms that are capable not only of identifying isolated incidents of fraud involving a single stolen presentation instrument, but that are also capable of identifying patterns across many presentation instruments and types of transactions. The fraud/risk detection and management module 252 may thus be used in authentication of the transactor(s) and transaction(s).

The host system may additionally comprise fulfillment and settlement modules 264 and 268, which are particularly advantageous in coordinating the various financial-transfer operations that will be effected in response to the types of transactions that are implemented. These modules provide rules for determining amounts that are due to or from each of the financial institutions and merchants to reconcile the implemented transactions. In addition, since funds for the merchants are usually maintained themselves in financial accounts held at the financial institutions, these modules identify which financial accounts are due to be debited by amounts and due to be credited by amounts, and coordinates instructions to effect such operations as required.

The system may also generally support transactions that involve different types of value, such as the various value types described above. In some cases, the different value types may be used directly. One example is where loyalty points are earned by a customer with a particular merchant who has specific rewards that may be offered when certain levels are reached. For instance, a chain of department stores may allow customers to accumulate points as items are purchased, promising the customers the ability to exchange 500 points for a one of several identified items (a toaster, a magazine rack, an electric razor, etc.), the ability to exchange 1000 points for of several (more valuable) identified items (a cordless drill, a table lamp, a clock fixture, etc), with several such tiers of exchange levels. When the customer selects one of such items, the system may permit the loyalty points to be exchanged in a direct fashion for the item.

In other instances, the system may apply a conversion among value types to permit one type of value to be used in supporting a transaction ordinarily conducted using a different value type. One example is where the department store described above allows customers to make purchases with the presentation instruments not only with one conventional currency, say U.S. dollars, but with different currencies, such as with Canadian dollars or with Euro, or even with noncurrency forms of value like cellular-telephone minutes or airline miles. The host system implements such capability by accepting the payment forms identified as acceptable by the department-store chain.

In a more complex example, the conversion among values is effectively hidden from the recipient, with the acceptance of different forms of value and conversion among them being handled by the host system. In an example of such an embodiment, the department store discussed above sells merchandise, accepting only U.S. dollars for payment. A customer using a presentation instrument may still purchase goods from the merchant using different forms of value, relying on the host system to effect conversions among the different value forms. For instance, the customer may specify that she wishes to apply frequent-flyer miles to make a purchase, with the host system accepting the frequent-flyer miles and providing U.S. currency to support the transaction in the from desired by the department store. In this way, the ability to offer increased choice to customers is enhanced—the customer is not limited by any specific arrangement desired by a particular merchant, but may instead make use of abilities of the host system to accommodate other arrangements. Also, the merchant is similarly advantaged since it is not compelled to support multiple types of transaction arrangements at increased complexity and expense to accommodate different customers; instead, it may rely on the capabilities of the host system to act as an interface between its desired method and those that may be preferred by various customers.

Figure 3:
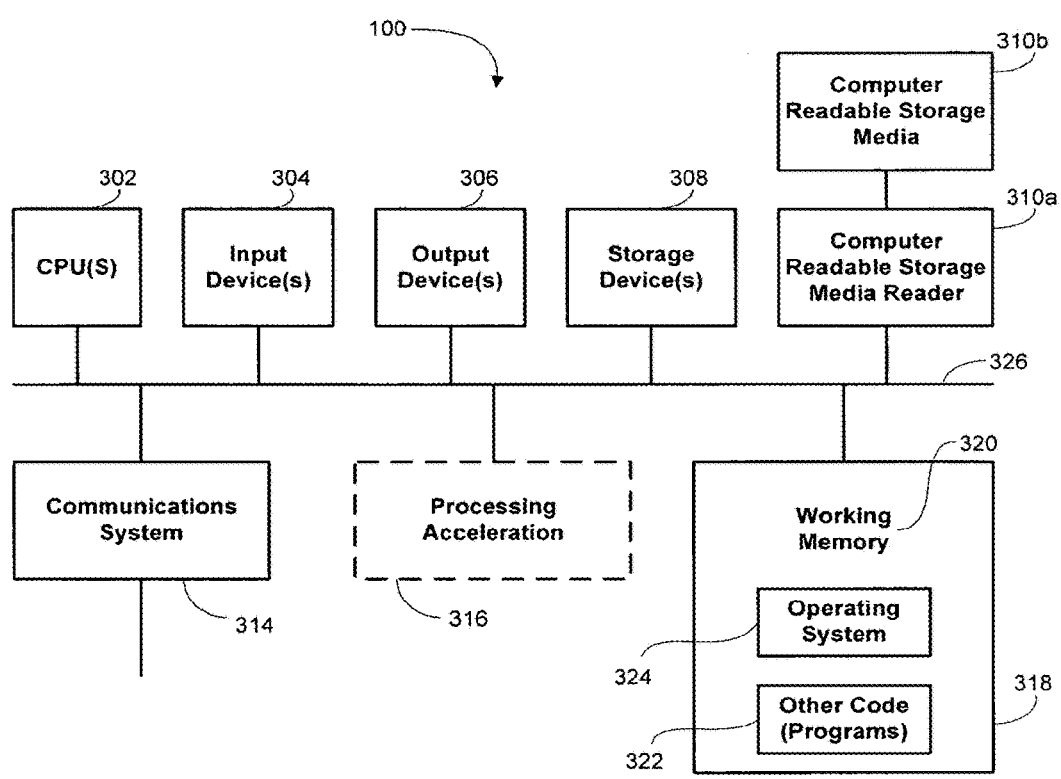
FIG. 3 is a schematic illustration of a physical structure of the host system on which methods of the invention may be embodied.

While FIG. 2 provides a schematic illustration of a logical structure for the host system 100, FIG. 3 instead provides a schematic illustration of a physical structure that may be used to implement the host system 100 in one embodiment. FIG. 3 broadly illustrates how individual system elements may be implemented in a separated or more integrated manner. The host system 100 is shown comprised of hardware elements that are electrically coupled via bus 326, including a processor 302, an input device 304, an output device 306, a storage device 308, a computer-readable storage media reader 310*a*, a communications system 314, a processing acceleration unit 316 such as a DSP or special-purpose processor, and a memory 318. The computer-readable storage media reader 310a is further connected to a computer-readable storage medium 310b, the combination comprehensively representing remote, local, fixed, and/or removable storage devices plus storage media for temporarily and/or more permanently containing computer-readable information. The communications system 314 may comprise a wired, wireless, modem, and/or other type of interfacing connection and permits data to be exchanged with the merchant devices 104 or any of the various consumer interfaces illustrated in FIG. 1 to implement embodiments as described below.

The host system 100 also comprises software elements, shown as being currently located within working memory 320, including an operating system 324 and other code 322, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

As previously noted, there may be a variety of different mechanisms that are used to provide enrollment with the system. In some embodiments, such enrollment is provided as an adjunct to the providing a customer with a presentation instrument in the first instance, with an Internet interface permitting the customer to modify the individual parameters governing the implementation of his enrollment. In other instances, enrollment may conveniently take place at a point of sale, advantageously increasing the pool of customers that may be targeted. An overview of some such methods is provided with FIGS. 4A and 4B. Use of enrollment methods and systems described herein may permit enrollment to be achieved significantly more quickly than various prior-art enrollment methods. For instance, enrollment that allows a customer to draw on funds in a demand deposit account like a checking or savings account in supporting transactions may be accomplished in minutes. This means that a customer who wishes to enroll at, say, a point of sale may make use of the methods and systems for processing transactions executed during that visit to the point of sale. While the discussion below often refers to enrollment at a point of sale for illustrative purposes, such references are not intended to be limiting. More generally, enrollment may take place at a variety of different locations, including at offices of financial institutions, with the Internet or over other networks, at a customer service desk, at in-store aisle locations, at enrollment kiosk booths, and the like. References to a "point-of-sale device" may thus include devices like those described in the point-of-sale device applications, but might alternatively comprise personal computers, personal digital assistants, handheld devices, and the like.

Figure 4A:
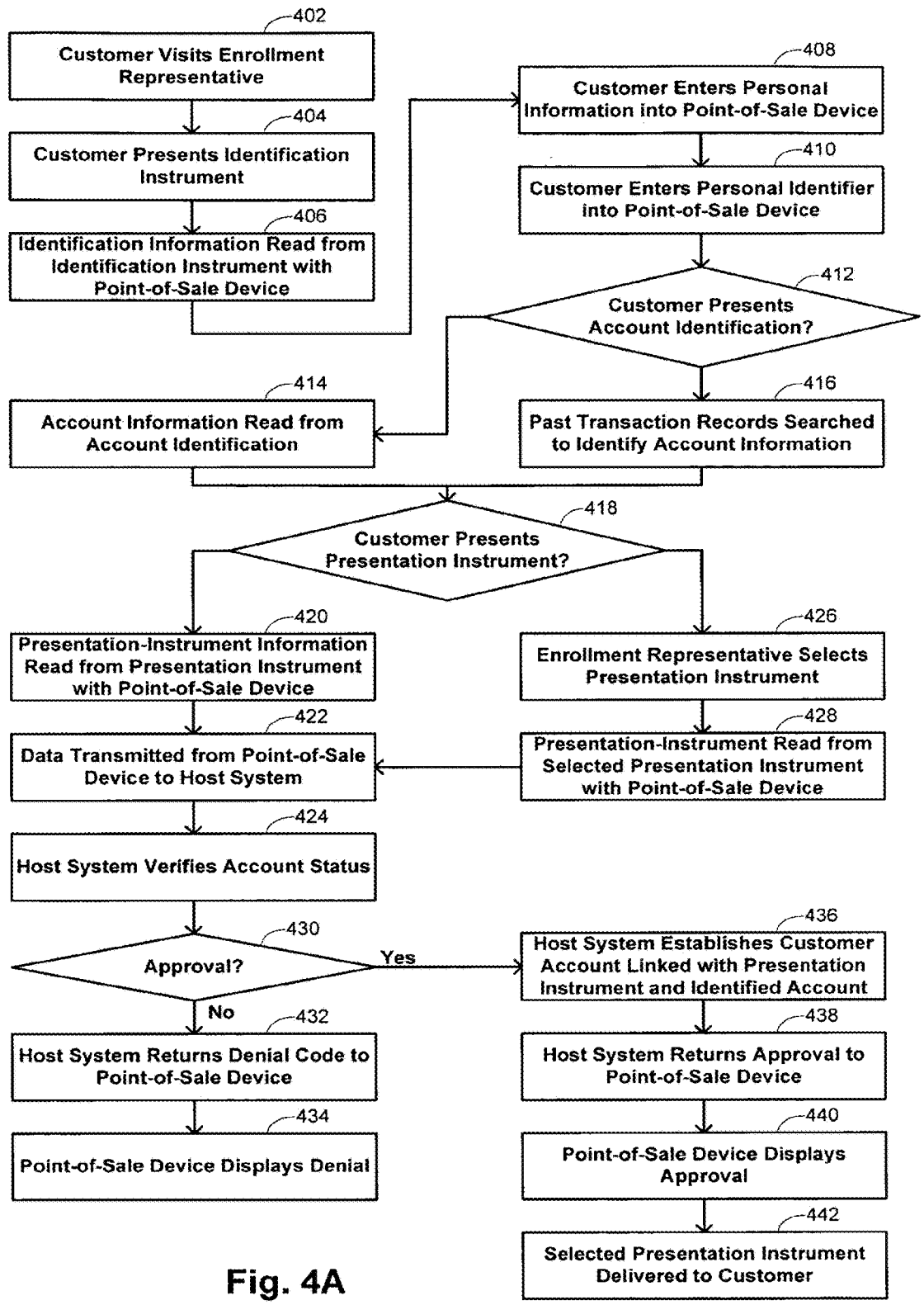
FIGS. 4A and 4B are flow diagrams illustrating point-of-sale enrollment methods used in embodiments of the invention.

Beginning at block 402 of FIG. 4A, a customer who wishes to enroll with the system at a point of sale may visit an enrollment representative, who is described below as located at a point of sale, but may be located elsewhere in different embodiments as noted above. The following discussion generally describes the enrollment process with the participation of an enrollment representative who may explain the operation and advantages of the system to the customer and help in coordinating the collection of information used for enrollment. In other embodiments, the role of the enrollment representative may be automated and provided as part of the functionality of a self-enrollment station. The representative has access to a point-of-sale device like those described above that permit information to be collected from a variety of different types of instruments; for instance, the point-of-sale device may be a device as described in the copending point-of-sale device applications. In embodiments that use a self-enrollment station, such a point-of-sale device may be provided as part of the station or its various functionalities integrated with those of the self-enrollment station.

At block 404, the customer presents an identification instrument. Usually the identification instrument has sufficient information that the enrollment representative may compare physical features of the person presenting it with those identified on the identification instrument. For example, a photograph or a description of eye color, hair color, height, and other physical features may be included. Typical identification instruments may include driver's licenses, state identification cards, passports, resident alien cards ("green cards"), and the like. The ability to match physical features acts as a preliminary check that the person seeking enrollment within the system is the same person who is authorized to control the underlying financial accounts that will be used in supporting transactions. In embodiments that use a self-enrollment station, mechanisms for using biometric measurements and other automatic techniques for checking identity as known in the art may be used. Identification information is read from the identification instrument with the point-of-sale device at block 406. This may be done by reading a magnetic-stripe card as is commonly included on driver's licenses or state identification cards, reading optically encoded data as is done on some resident alien cards, by performing optical character recognition on cards that lack other magnetically or optically encoded data, and the like. In some instances, the information may be keyed into the point-of-sale device by the enrollment representative if alternative mechanisms for extracting the identification information are unavailable. The identification information that is extracted at this step is such information as the name and address of the customer, rather than the physical information that was used for an initial identification. In some instances, techniques such as prefilling of known data and seeking confirmation of data via commercially available data sources may be used to supplement the identification extraction.

At block 408, the customer may enter additional personal information into the point-of-sale device that is not included on the identification instrument. Such information may include information to be used in administering the system for the customer, such as her telephone number, or may include information to be used in confirming identity for later processes, such as birthdate or other information. At block 410, the customer chooses and enters a personal identifier, such as a PIN, into the point-of-sale device. This personal identifier is generally used to confirm identity as described below for specific transaction processing.

Once such preliminary information has been provided to the point-of-sale device, the customer will usually present an identification of a financial account that is to be used in supporting transactions. For instance, in the case of a checking account that is to be used, the account identification will usually be a voided check. This is a preferred form of account identification since it may be required that the voided check have a magnetically printed account number and be printed with the name of the customer. Verifying that the name printed on the check matches the name on the identification instrument further reduces the risk of fraud. In other instances, though, a deposit slip for the checking account may be accepted. In other instances, the customer may simply provide the account and routing numbers for the checking account, although such embodiments may be subject to higher risks of fraud. In embodiments where the financial account is a savings account, a deposit or withdrawal slip may be provided. In embodiments where the financial account is a credit account, a credit card may be provided. In embodiments where the financial account stores other forms of value, such as cellular-telephone minutes or airline miles, a statement from the institution identifying the account number where those forms of value are stored may be provided.

A check is accordingly made at block 412 whether the customer has presented account identification. In the usual course of action where she has, account information is read from the account identification or is otherwise provided to the point-of-sale device, such as by having the enrollment representative key the information, at block 414. In other instances where no account identification has been provided, the point-of-sale device may initiate at block 416 a search of past transaction records executed by that customer to see whether an identification of the account may be recovered in that way. For instance, the customer may have used a traditional debit card to access a checking account in executing a transaction without being part of the more integrated and flexible system described herein. The information from that past transaction may be used at block 416 to identify the account information that would otherwise be read from the account identification at block 414.

At this point, the customer may be given the option of enrolling an existing presentation instrument with the system or of having a new presentation instrument provided. The new presentation instrument might take the form of a loyalty card, for instance, that identifies the customer with a particular merchant, but whose registration with the system may later permit it to be used for other types of transactions and at other accepting locations as described herein. A check is accordingly made at lock 418 whether the customer presents an existing presentation instrument. If so, information is read from the presentation instrument by the point-of-sale device at block 420. If not, the enrollment representative (or automated system) selects a potential presentation instrument at block 426 and information is read by the point-of-sale device from that selected instrument at block 428.

The point-of-sale device now has sufficient information to transmit an enrollment request to the host system at block 422. Such an enrollment request may include the identification information, such as name and address of the customer; the financial account information identifying the financial account to be enrolled with the system; and the presentation-instrument information identifying the presentation instrument to be enrolled with the system. The host system determines whether to approve the enrollment request at block 430. Such a determination may include verifying the existence of and a certain current minimum balance in the identified financial account, checking the credit score of the person being enrolled, checking for any adverse indications recorded regarding that person or that account, and the like.

If approval is granted, the host system establishes a customer account with the system, and links that customer account with both the presentation instrument and the identified financial account at block 436. The "customer account" refers to an account used by the host system to administer the functionality of the system for a particular customer and is in this respect distinct from the various financial accounts that may ultimately be used in supporting transactions executed by the customer. The customer account typically includes identification information for the customer as well as a specification of every presentation instrument and financial account supported by the host system for that customer. At block 438, the host system returns an approval code to the point-of-sale device that originated the request, allowing the point-of-sale device to display an approval message at block 440. Because of this arrangement, the time between sending the enrollment request and receiving the approval response may be on the order of minutes, rather than on the order of days or weeks, as might have been necessary for certain prior-art arrangements, particularly in the case of financial accounts that comprise demand deposit accounts. If the presentation instrument was one selected by the enrollment representative at block 426, then that selected presentation instrument is delivered to the customer at block 442. Because the approval time was only on the order of minutes, the customer may now execute transactions using the presentation instrument substantially contemporaneously with enrollment, i.e. during the same visit to the point of sale.

If the host system instead determines that the enrollment request is to be denied, it returns a denial code at block 432 so that the point-of-sale device may display a denial message at block 434.

Figure 4B:
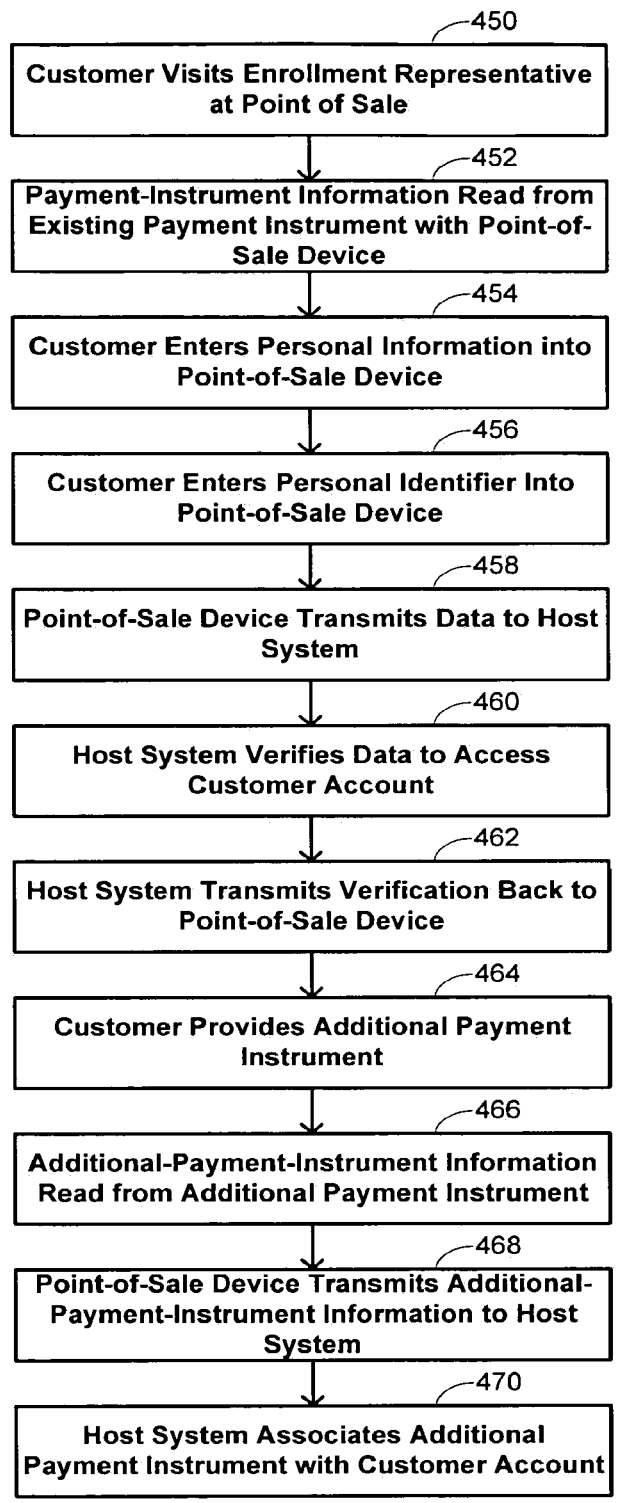

FIG. 4B uses a flow diagram to illustrate a method by which an enrolled customer may add presentation instruments to his customer account maintained by the host system. This method may be implemented at any time after enrollment, whether it be during the same point-of-sale visit where enrollment was initiated or performed years later when the customer acquires a new presentation instrument. At block 450, the customer visits an enrollment representative at a point of sale and thereafter provides information sufficient to identify the customer account to be modified. This may include providing an existing presentation instrument enrolled with the customer account at block 452 so that it may be read with the point-of-sale device. At block 454, the customer may be required to provide an identification of herself by entering the identification information registered with the system at block 454. In addition, the customer may be required to provide her personal identifier in the form of a PIN at block 456, as a mechanism for reducing the risk of fraudulent access to the customer account.

Once it has collected this identification information, the point-of-sale device transmits the data to the host system at block 458 to enable the host system to verify the data and thereby access the customer account at block 460. To permit the process to proceed, the host system may then transmit a verification back to the point-of-sale system at block 462. The presentation instrument that the customer wishes to have identified by the system is provided by the customer at block 464, permitting information from the additional payment instrument to be read from it at block 466. This information in transmitted back to the host system from the point-of-sale device at block 468, allowing the host system to associate this additional payment instrument with the customer account at block 470. Again, this process may take only on the order of minutes to complete, and the customer may thereafter use the additional presentation instrument to support transactions from any financial accounts identified with his customer account.

Figure 5A:
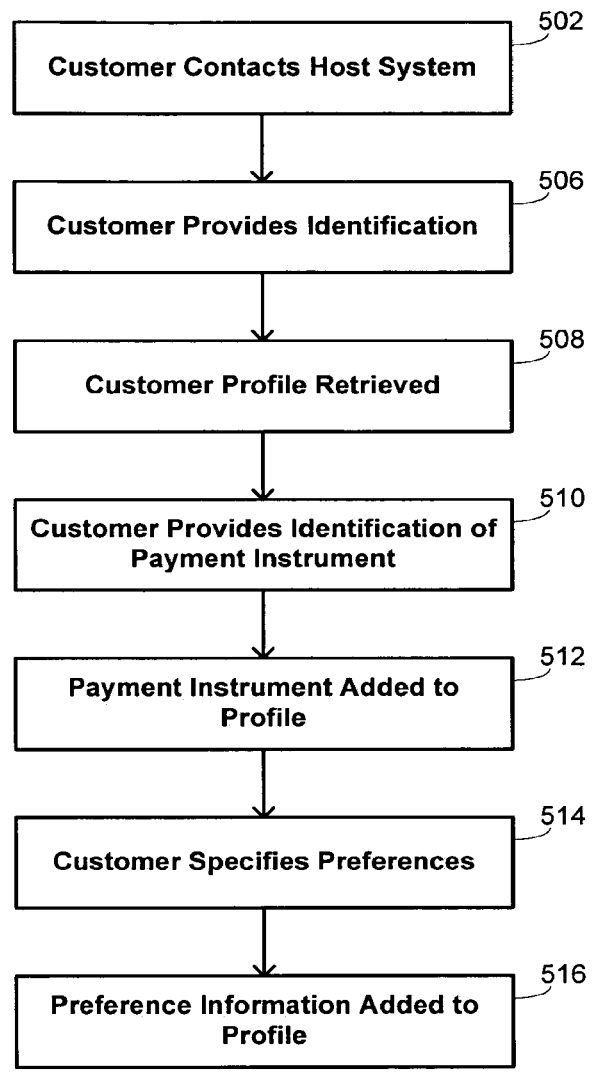
FIGS. 5A-5D are flow diagrams illustrating methods of the invention in different embodiments.

Methods that may be implemented by the host system in processing financial transactions are illustrated with flow diagrams in FIGS. 5A-5D. FIG. 5A illustrates an exemplary method by which a customer may interface with the host system 100 to enroll a new presentation instrument for subsequent recognition by the host system 100. As previously mentioned, it is usually the case that the customer will initially be enrolled automatically when a presentation instrument is acquired from a merchant or financial institution. Accordingly, the enrollment illustrated with FIG. 5A will usually be to add a presentation instrument for an existing customer, but in some instances this process may be used to add information about a completely new customer as well.

At block 502, the customer contacts the host system 100, such as by using one of the interfaces described in connection with FIG. 1. The customer provides identification information at block 506, such as in the form of information from a presentation instrument that is already registered with the host system 100 or in the form of authentication data that may be used when transactions are implemented. This identification information is used to retrieve the customer's profile at block 508 so that additional preferences information may be added.

The host system 100 thus has a profile for the customer available at block 510 when the customer is asked to provide an identification of the payment instrument to be added to the profile. This identification may vary depending on the type of payment instrument and may correspond, for example, to financial-account-number and expiry-date information for a magnetic card, to a radio-frequency signature for an RFID device, to a routing number and financial-account number for a check, to a biometric signature for the individual, or any other information suitable for identifying the different types of payment instruments discussed above. This identification thus acts as a personal identification indicator that may be created with key data from the consumer and later used in combination with the personal identifier for providing access. At block 512, the payment instrument is added by the host system 100 to the customer's profile with the appropriate identification information. The customer may now specify preferences at block 514 that specify how transactions initiated with that payment instrument are to be handled by the host system 100. Such specification may include modifying existing preferences and may include adding additional financial accounts that could be used by the customer's profile in allocating amounts for the transaction. The enrollment of the additional payment instrument is completed at block 516 by adding the updated preference information to the customer's profile.

Figure 5B:
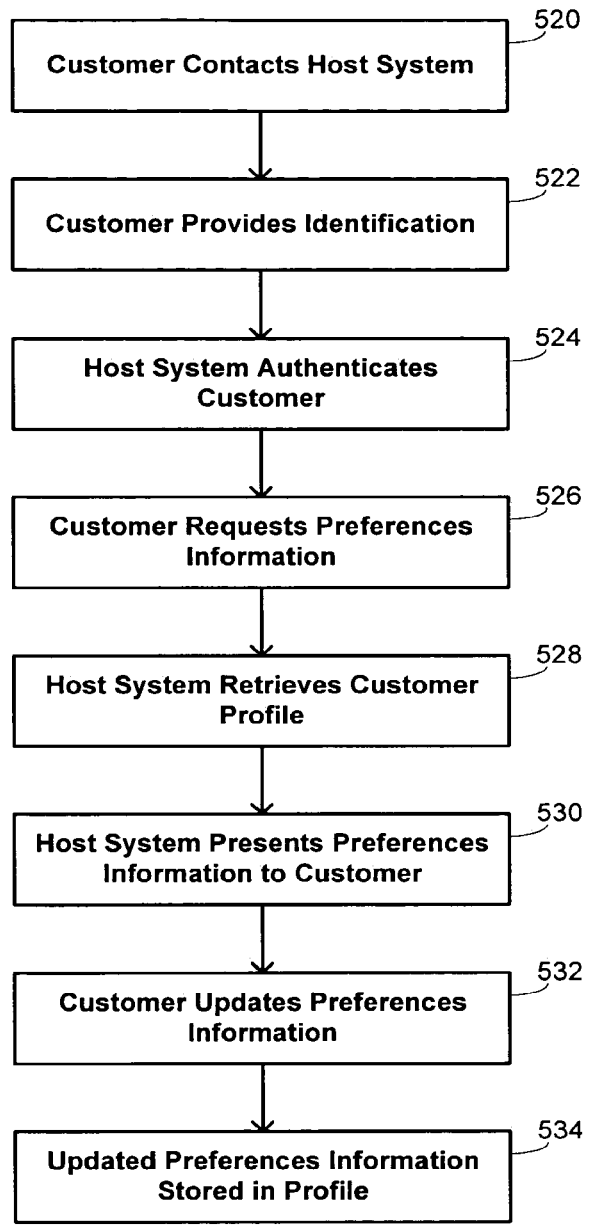

The flow diagram of FIG. 5B illustrates an exemplary method by which the customer may manage his or her profile information as it maintained by the host system 100. At block 520, the customer contacts the host system 100, again such as by using one of the interfaces described in connection with FIG. 1. At block 522, the customer provides identification information so that the host system may authenticate the customer at block 524. The identification information could comprise information from a presentation instrument that is registered to the customer by the host system 100 or could comprise authentication data such as is usually provided during transactions. Once the customer has been authenticated, the customer initiates profile-management functions by requesting preferences information at block 526. The customer profile is retrieved by the host system at block 528 and the preferences information is provided to the customer at block 530. Such retrieval permits the customer to update the preferences information as desired at block 532 so that the updated information may be stored in that customer's profile at block 534. In this way, each customer is provided with the ability to modify profiles to maintain the desired allocations of transaction amounts among transaction types when transactions are executed.

Figure 5C:
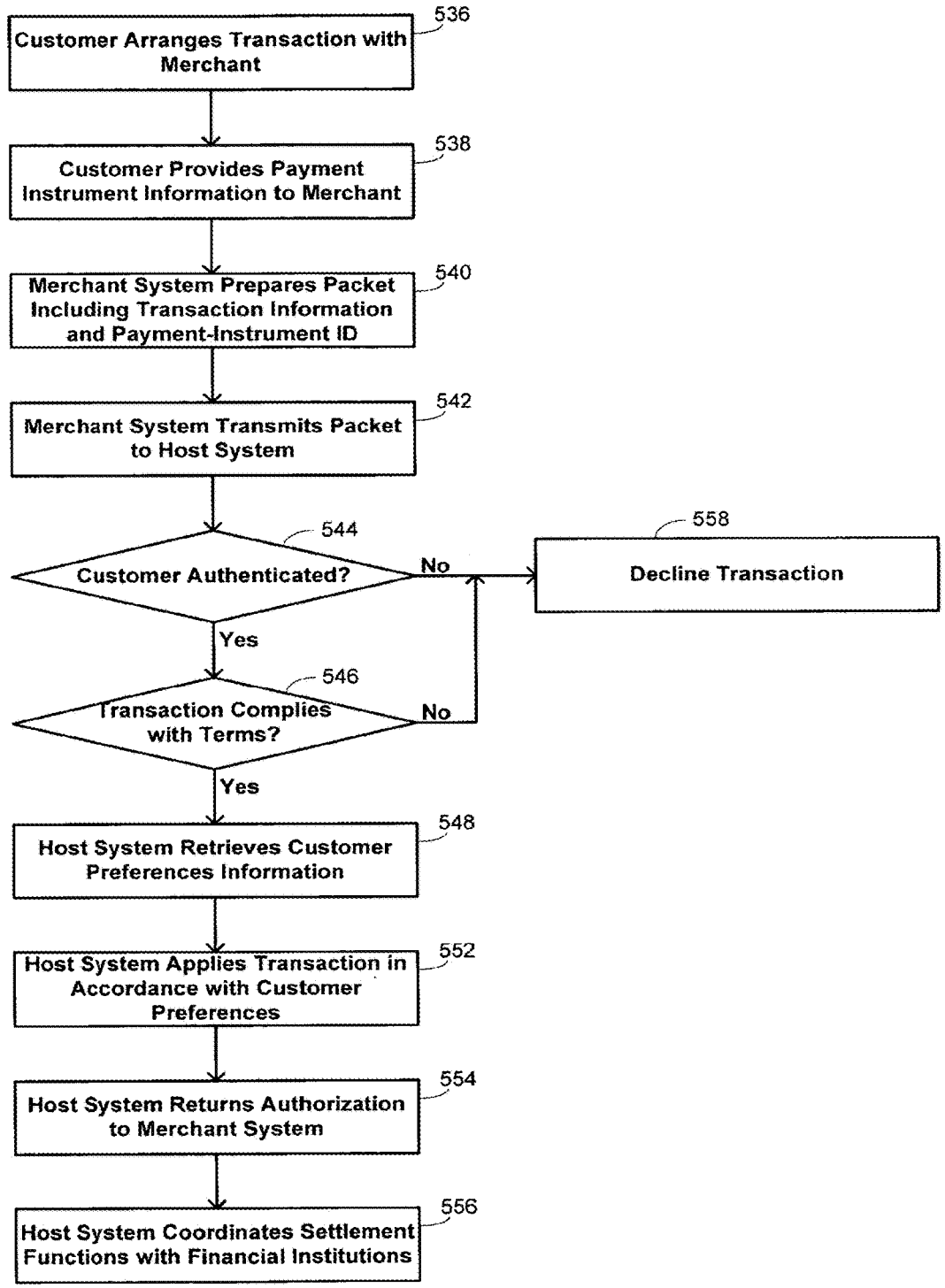

An illustration of how the structure of the host system 100 may be used in processing a transaction between a customer and a merchant is illustrated with the flow diagram shown in FIG. 5C. The method may begin with the customer arranging the transaction with the merchant at block 536 by any suitable mechanism. For example, in a brick & mortar application, the customer may select a number of items for purchase and bring them to a clerk for payment; in a telephone-order application, the customer may select items from a catalog and telephone a merchant representative to place an order for the items; in an Internet application, the customer may select items presented on a merchant web site, and fill an electronic "shopping basket" with the selected items; and the like. At block 538, the customer provides information regarding a payment instrument to the merchant, such as by scanning an RFID key fob at a brick & mortar location, keying in a credit-card number on an Internet site, providing a voice print as part of a telephone order, and the like. In response, the merchant system 104 prepares a packet of information for transmittal to the host system 100 at block 540. The packet generally contains at least some transaction information and an identification of the payment instrument. The specific transaction information that is included may be very limited, such as in embodiments where only the total amount to be paid is included, or may be more extensive. For instance, the transaction information could identify the merchant, could identify the merchant location, could include authentication information also provided by the customer, could provide an itemized identification of every item being purchased, and the like. This type of information may be useful in those embodiments where the customer preferences information is dependent on such information. The itemized identification of items being purchased may be derived, for example, by using Universal Product Code or equivalent information extracted by reading a bar code affixed to the items or to a label attached to the items.

After the packet of information is transmitted to the host system 100 at block 542, a number of functions may be performed by the host system 100 with the received information. At block 544, for example, the customer may be authenticated by the host system using any of the techniques described above in connection with the authentication module 220, including use of biometrics, signatures, encryption certificates, specification of the personal identifier, and the like. If the host system 100 fails to authenticate the customer, the transaction may be declined by the host system 100 at block 558, with a decline code being communicated back to the merchant system 104. If the customer is authenticated, a check may be performed by the host system 100 at block 546 to verify that the transaction complies with certain global terms. For example, such a check may be used to ensure that a credit transaction will be within predetermined credit limits, that a debit transaction will be for less than an available balance in a financial account, that a stored-value-card transaction will be for less than an amount remaining on the card, and the like. If such global terms are not met by the transaction, it may be declined at block 558, with a decline code again being communicated back to the merchant system 104.

If the transaction is to be processed by the host system 100, the host system retrieves customer preferences information at block 548 and applied the transaction in accordance with those preferences, several examples of which were illustrated above. The host system 100 returns an authorization code back to the merchant system 104 at block 554 to indicate that the transaction has been accepted and executed; this authorization code signifies to the merchant that the transaction should be completed between the customer and merchant as indicated.

It will be appreciated that the illustration of FIG. 1 has been simplified for purposes of illustration. In an actually deployed system, the number of components that may be involved is significantly larger and there may be an even greater number of interconnections among the components. The result is a web-like system that has a large number of potential routing paths for information from any two points within the system. Moreover, the scale of such interconnection is further enhanced by supporting the diversity of presentation instruments. The host system may accordingly be capable of identifying efficient routing paths that might not be available for transactions processed in a more traditional fashion. Routing paths support optimization of transaction value and cost. The routing may be determined via pre-established parameters related to such aspects as the identities of the participant parties, risk levels, choice of merchant and/or financial institution, liability levels, and the like.

This capability is used in some embodiments to generate profit. For instance, a traditional transaction may include $0.02 in routing costs using an existing routing network. By providing the host system with access not only to that existing routing network, but also to other existing routing networks traditionally used in supporting different types of transactions, the host system may identify a routing path that incurs only $0.01 in routing costs. Access to such a path with its decreased costs may be provided by the host system at a cost of $0.015, so that the entity initiating the routing saves $0.005 on the transaction and the entity operating the host system realizes a profit of $0.005 on the transaction, or realizes a corresponding savings that may be shared with contributing parties. The numerical values in this example are intended only to be illustrative and the marginal profit is also only illustrative since other arrangements may be used in different embodiments.

In addition to using such routing capabilities advantageously in seeking transaction authorizations, the host system may also use third-party guarantors to provide transaction authorizations. For example, a third party may offer to consider transaction criteria and provide an authorization for the transaction, thereby receiving a fee for performing the authorization and also accepting an associated default risk. In some instances, an entity operating the host system may act as a third-party guarantor and provide a transaction authorization on such a basis. The information used in performing the authorization may involve statistical or modeling techniques to enable authorization decisions to be made on partial information, i.e. without requiring that a particular financial account be accessed to ensure that it has a sufficient balance to support the transaction. For instance, a transaction that is to be supported by cellular-telephone minutes might be approved by a third party using such techniques on the basis of past history of the customer, not checking the minutes balance in real time but perhaps doing so later in batch mode when multiple balances may be checked for multiple customers.

FIG. 5C includes an example of additional functions that may be performed by the host system 100 separate from a specific transaction in the form of settlement functions. It is generally expected that the host system 100 will process a large number of transactions using the method described above. Periodically, such as every day or every week, the host system 100 will coordinate settlement functions with the issuers of funding sources, such as the financial institutions 108, as indicated at block 556. Such settlement functions ensure that funds transfers are made as required to accommodate the terms of approved transactions. The host system 100 may, of course, perform additional administrative functions that are not explicitly shown in FIG. 5C, some of which have been discussed briefly above. One example of such an additional administrative function is a fraud-analysis that is performed of multiple transactions to identify potentially fraudulent activity.

Figure 5D:
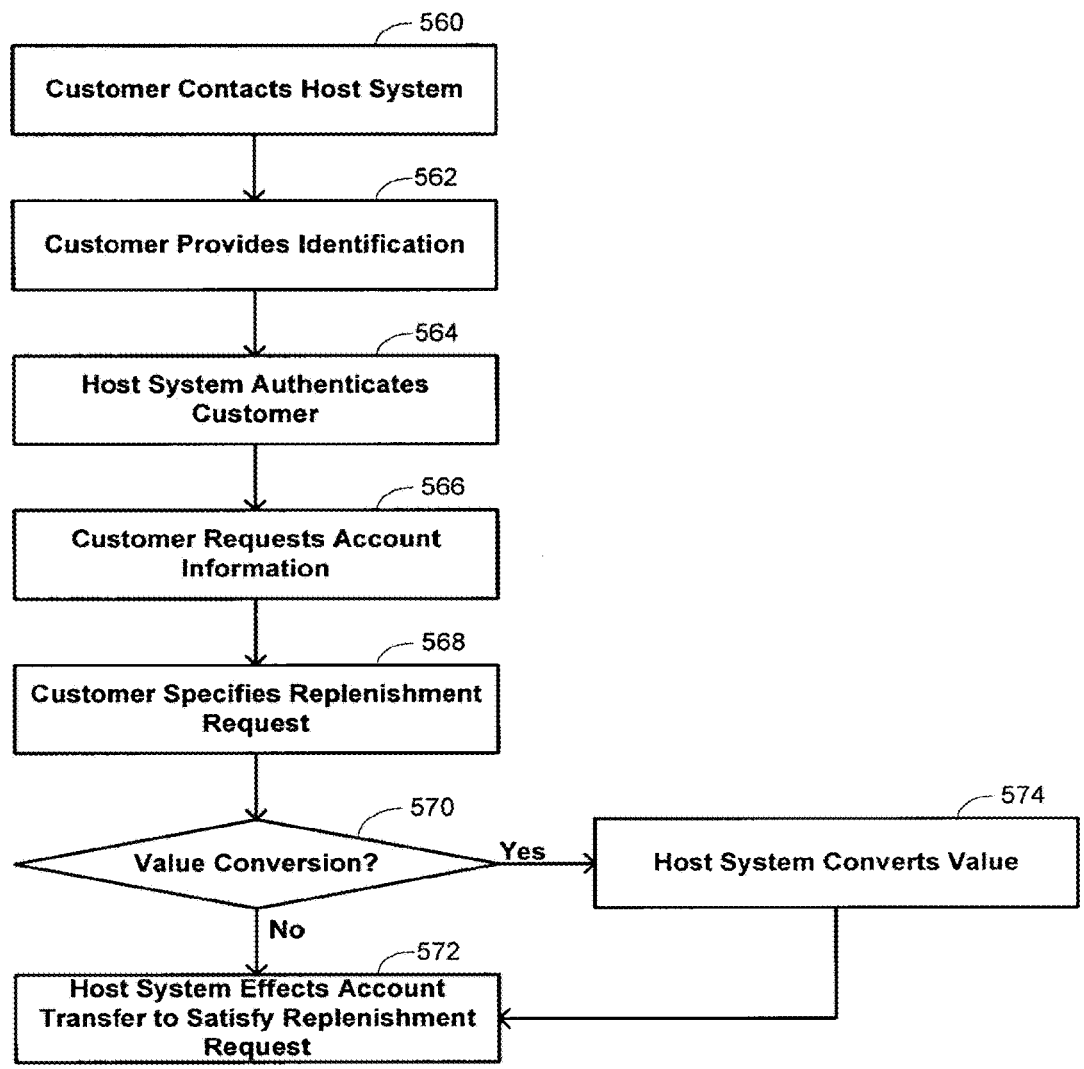

FIG. 5D includes an example of replenishment functions that may be performed with the host system. Such replenishment functions advantageously permit balances in some registered financial accounts to be funded with balances from other registered financial accounts. To initiate such replenishment, a customer contacts the host system 100 at block 560, such as by using one of the interfaces described in connection with FIG. 1. To permit the host system 100 to authenticate the customer and thereby provide access to information used in effecting the replenishment, the customer provides identification at block 562. Similar to obtaining access for other functions, such identification may comprise information from a presentation instrument registered to the customer by the host system 100 or could comprise authentication data such as is usually provided during transactions. After authentication of the customer by the host system 100 using this identification at block 564, the customer may request financial-account information at block 566. Such account information may specify any of a number of parameters that describe the financial account, including the institution that holds it, the type of financial account that it is, the balance of the financial account, the type of value held by the financial account, and the like.

After reviewing the financial accounts, the customer may specify a replenishment request at block 568. Such a request defines one or more financial accounts to serve as a source for the replenishment value, one or more financial accounts in which value is to be replenished, and specifies a value amount. In many instances, the type of value in both the source and target financial accounts is the same, but in some instances they may differ, such as where a financial account holding cellular-telephone minutes is to be used in replenishing a financial account holding U.S. dollars. In such instances, specifying the value amount is usually performed in terms of the source or target value type, although a third value type may be used in making such a specification in some instances. For example, a replenishment request might ask that $50 worth of frequent-flyer miles from one financial account be used to replenish a financial account of cellular-telephone minutes.

Because of such possibilities, the host system 100 checks at block 570 whether a conversion of value needs to be made as part of the replenishment function and, if so, performs such a conversion at block 574. The replenishment is then effected by the host system 100 at block 572. The replenishment is effected by a transfer of value similar to that used when supporting a transaction except that the financial account(s) where the value originates and the financial account(s) to which it is sent are owned by the same party.

It is also noted that while each of FIGS. 4A-5D provides an exemplary set of functions and an exemplary order for those functions, variations are also intended to be within the scope of the invention. In particular, there is no requirement that the functions represented by the blocks be performed in the order indicated; in alternative embodiments, various of the functions might be performed in a different order. Also, there is no requirement that every indicated function be performed; in some cases only a subset of the functions might be performed and in other instances additional functions may also be performed.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for a customer to conduct a purchase transaction at a point-of-sale (POS) device, the method comprising:
   receiving, by a computer system, enrollment information to register a payment account, wherein the registration comprises authentication information, the authentication information comprising:
   a personal identification number (PIN) selected by the customer; and
   a telephone number of the customer;
   receiving, by the computer system, transaction information and an encryption certificate from the POS device of a merchant, wherein the transaction information corresponds to the purchase transaction and comprises authentication information;
   authenticating, by the computer system, the customer using the authentication information and the encryption certificate;
   determining, by the computer system, to guarantee the purchase transaction at least partially based on a statistical or modeling technique used without first accessing the payment account of the customer to determine that a sufficient balance is present to support the purchase transaction;
   after authenticating the customer, routing, by the computer system, the purchase transaction, wherein payment of the purchase transaction is guaranteed by an entity operating the computer system; and
   transmitting, by the computer system, a transaction authorization that indicates payment of the transaction is guaranteed by an entity operating the computer system.

2. A computer program product residing on a non-transitory processor-readable medium for a customer to conduct a purchase transaction at a point-of-sale (POS) device, the computer program product comprising processor-readable instructions configured to cause a processor to:
   receive enrollment information to register a payment account, wherein the registration comprises authentication information, the authentication information comprising:
   a personal identification number (PIN) selected by the customer; and
   a telephone number of the customer;
   receive transaction information and an encryption certificate from the POS device of a merchant, wherein the transaction information corresponds to the purchase transaction and comprises authentication information;
   authenticate the customer based on the authentication information and the encryption certificate;
   determine to guarantee the purchase transaction at least partially based on a statistical or modeling technique used without first accessing the payment account of the customer to determine that a sufficient balance is present to support the purchase transaction;
   route the purchase transaction, wherein payment of the purchase transaction is guaranteed; and
   transmit a transaction authorization that indicates payment of the transaction is guaranteed.

* * * * *